J. REECE.
VARIABLE SPEED TRANSMISSION.
APPLICATION FILED MAR. 11, 1920.

1,428,660.

Patented Sept. 12, 1922.
5 SHEETS—SHEET 1.

Inventor,
John Reece,
by Rogers, Kennedy & Campbell,
his Attys.

J. REECE.
VARIABLE SPEED TRANSMISSION.
APPLICATION FILED MAR. 11, 1920.
1,428,660.
Patented Sept. 12, 1922.
5 SHEETS—SHEET 2.
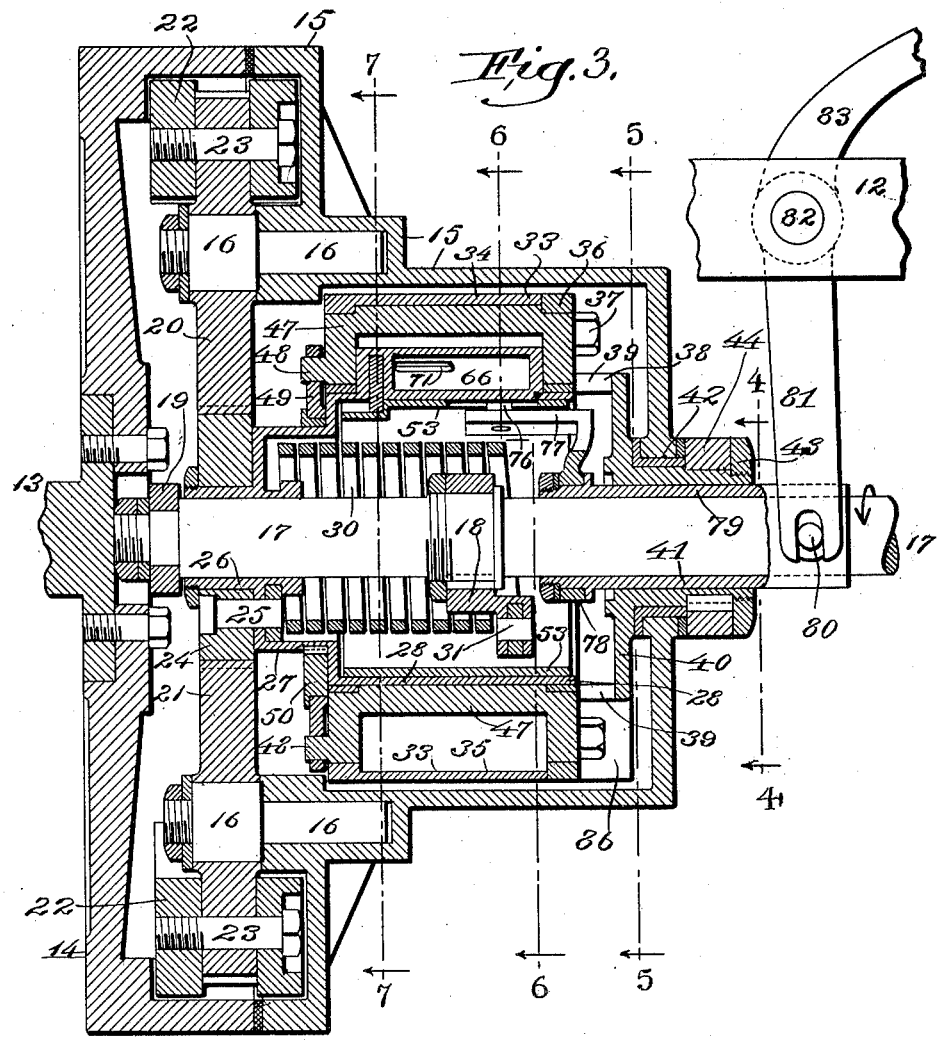
Fig. 3.
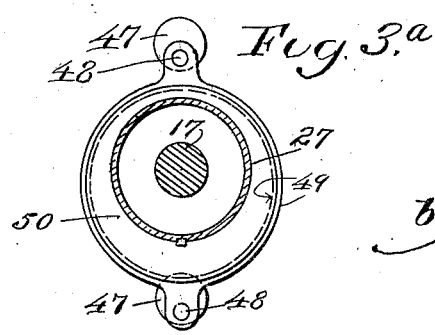
Fig. 3.ª
Inventor;
John Reece.
by Rogers, Kennedy & Campbell,
his Attys.

J. REECE.
VARIABLE SPEED TRANSMISSION.
APPLICATION FILED MAR. 11, 1920.

1,428,660.

Patented Sept. 12, 1922.
5 SHEETS—SHEET 4.

J. REECE.
VARIABLE SPEED TRANSMISSION.
APPLICATION FILED MAR. 11, 1920.
1,428,660.
Patented Sept. 12, 1922.
5 SHEETS—SHEET 5.
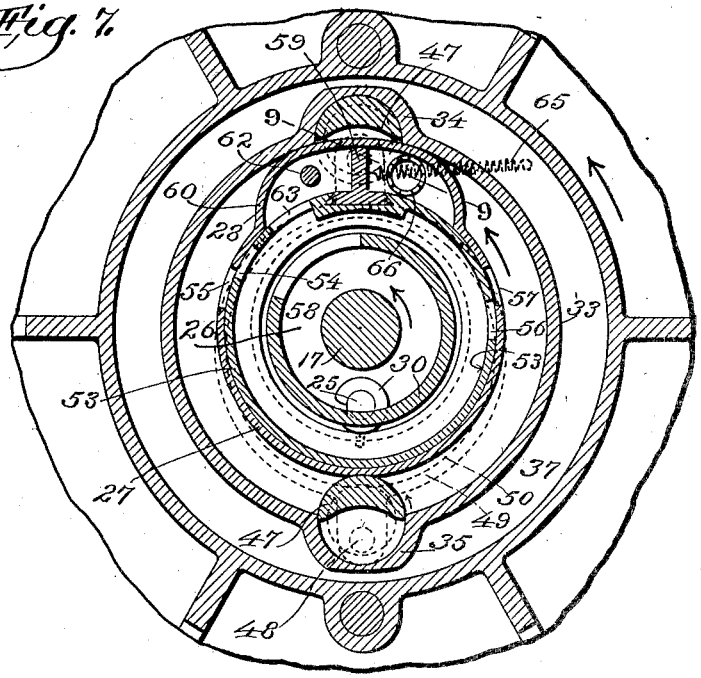
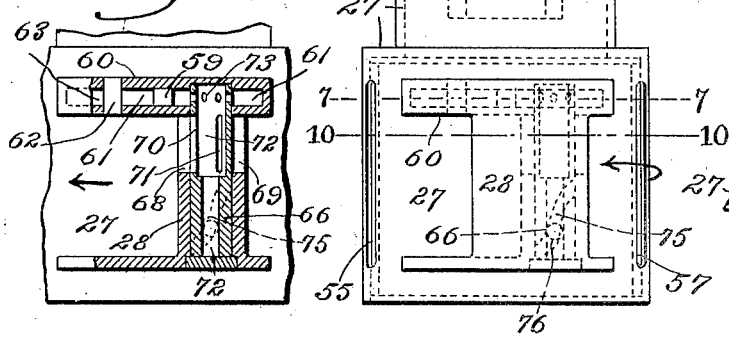

Patented Sept. 12, 1922.

1,428,660

UNITED STATES PATENT OFFICE.

JOHN REECE, OF BOSTON, MASSACHUSETTS, ASSIGNOR TO REECE TRANSMISSION COMPANY, OF BOSTON, MASSACHUSETTS, A CORPORATION OF MAINE.

VARIABLE-SPEED TRANSMISSION.

Application filed March 11, 1920. Serial No. 364,896.

*To all whom it may concern:*

Be it known that I, JOHN REECE, a citizen of the United States, residing at Boston, in the county of Suffolk and State of Massachusetts, have invented certain new and useful Improvements in Variable-Speed Transmission, of which the following is a specification, reference being had therein to the accompanying drawing.

This invention is a novel variable speed transmission adapted to use in various situations and for various purposes, for example, as a part of the power transmission mechanism of motor vehicles.

The general object is to improve variable speed transmissions as heretofore known, and more especially by affording a mechanism by which the speed ratio between the engine and the driven parts may be adjusted to any required point between the maximum and minimum. Other objects are to afford a mechanism in which, when running at full or normal speed, there will be required no internal motion or change of relation of the parts; also to give quietness and smoothness of action; to avoid the transmission from the engine to the driven parts of vibratory action in the engine; and to afford a simple and effective means of reversing the drive. Also it is an object to afford a transmission mechanism which can be utilized as a brake for retarding the vehicle or machine being driven; also one which may be readily adjusted to give free running at will and without the necessity of disengaging the usual clutch. Other objects and advantages of the invention will be made clear in the hereinafter following description of one form or embodiment hereof, or will be obvious to those skilled in the art.

To the attainment of the objects and advantages mentioned, the present invention consists in the novel variable speed transmission and the novel features of combination, arrangement, mechanism, design and detail herein described or claimed.

Preliminarily it may be stated that my invention involves, in addition to the driving member, operated for example, at uniform speed by the engine, and the eventual driven member or shaft, an intermediate rotatable member which is connected in the manner to be described with both the driving and driven members. Associated with the intermediate rotatable member or between it and the driven shaft I introduce an elastic or spring connection, which is capable of acting as a reservoir of energy such that a certain amount of irregularity or intermittency of motion or action in the intermediate member is permitted without materially affecting the steadiness of rotation of the driven shaft, but maintaining a substantially uniform force or torque thereupon. I also provide a certain yielding connection between the driving member and the intermediate member. This is a device of such nature and so arranged with relation to the driving and intermediate members that at one part of the rotation or cycle of action the driving member, operating through the yielding device, urges forward the intermediate member, whereas at another period or stage of the action, and while the intermediate member is substantially stationary or anchored, the yielding member, reasserting itself, applies its energy to a forward impulse on the driving member. In combination with these described elements, I employ a means for varying at will the action or effect of the yielding connection operating between the driving and intermediate members, in such way as to enable the advance of the intermediate member, or rather its average rate of advance, which is irregular, to be increased or diminished at will. When the ratio is unity, all parts, including the intermediate member, rotate uniformly as a unit and without reciprocation or relative change of position. As will be seen, the mechanism is such as to enable free-running, or braking, or reverse driving at will to be effected.

In the accompanying drawings, Fig. 1 is a top plan view indicating portions of a motor vehicle and a transmission mechanism embodying the principles of the present invention.

Fig. 3 is a central section taken on the line 3—3 of Figs. 1 and 2.

Fig. 3ª is a front elevation, that is, seen from the left of Fig. 3, of the members 27, 50, 49, 48 and 47, the first mentioned shown in section.

Figure 1:
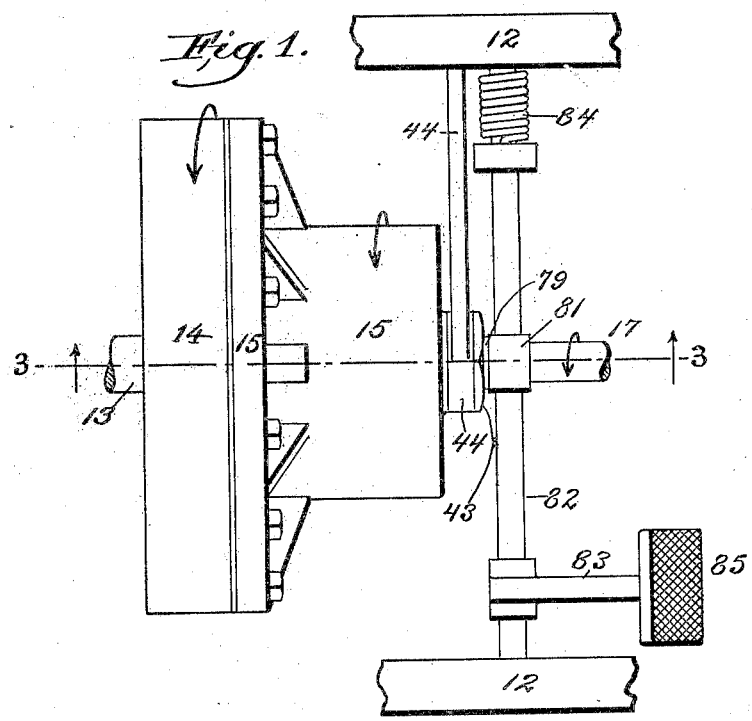
Figure 4:
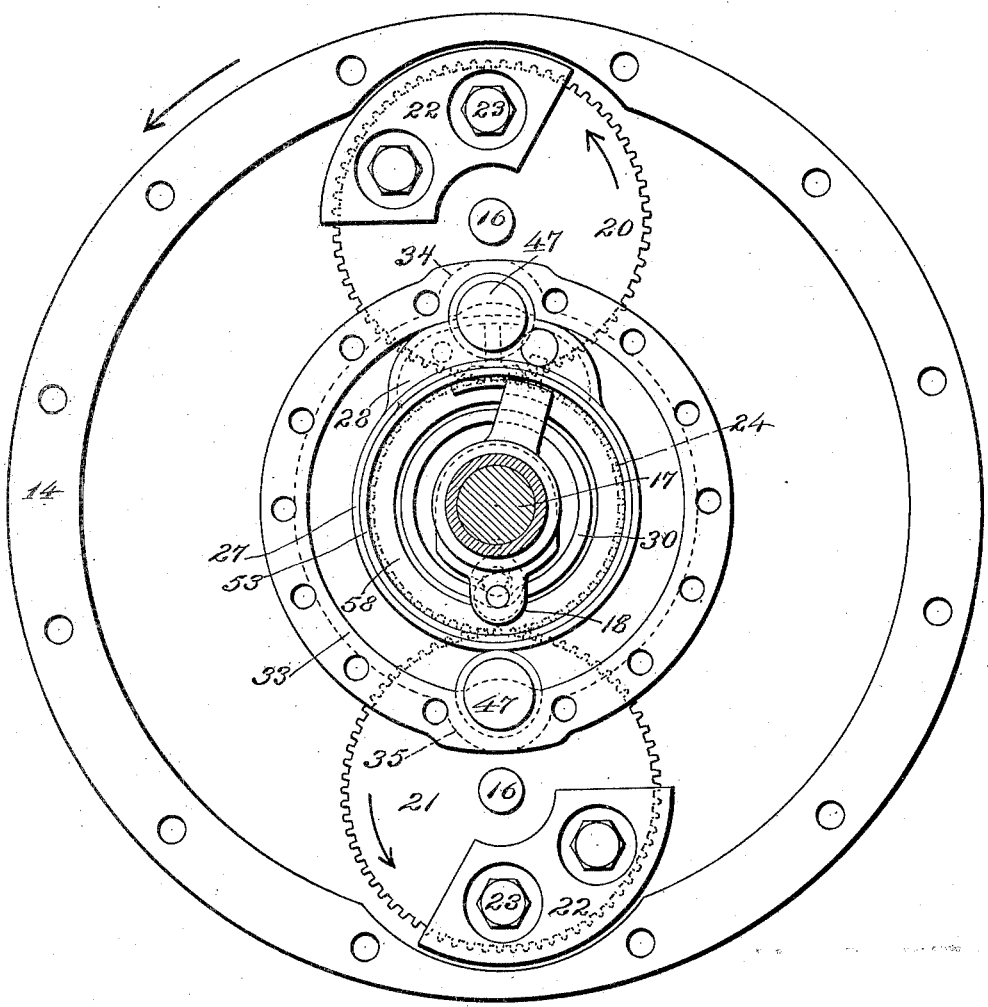

Fig. 4 is a right elevation partly in section on the line 4—4 of Figs. 1 and 3, with the cover plate removed to show the interior parts.

Figure 5:
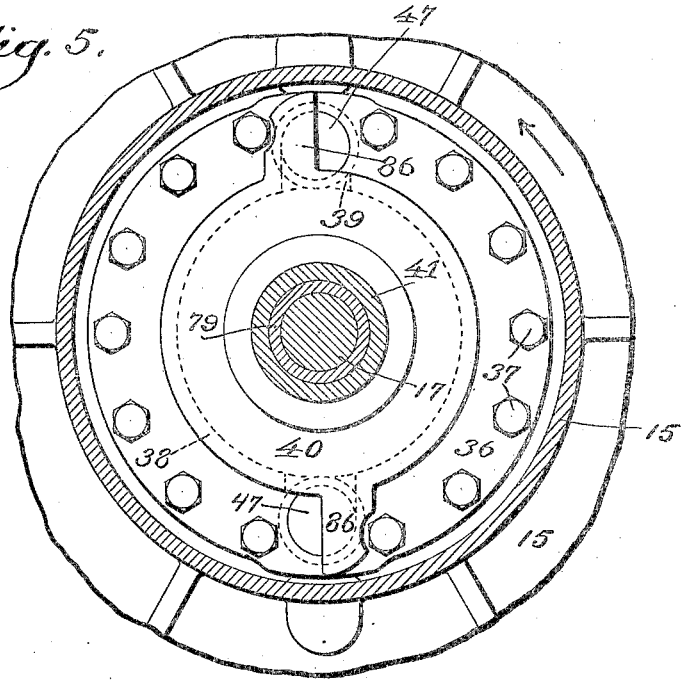

Fig. 5 is a similar right elevation partly in section on the line 5—5 of Fig. 3.

Figure 6:
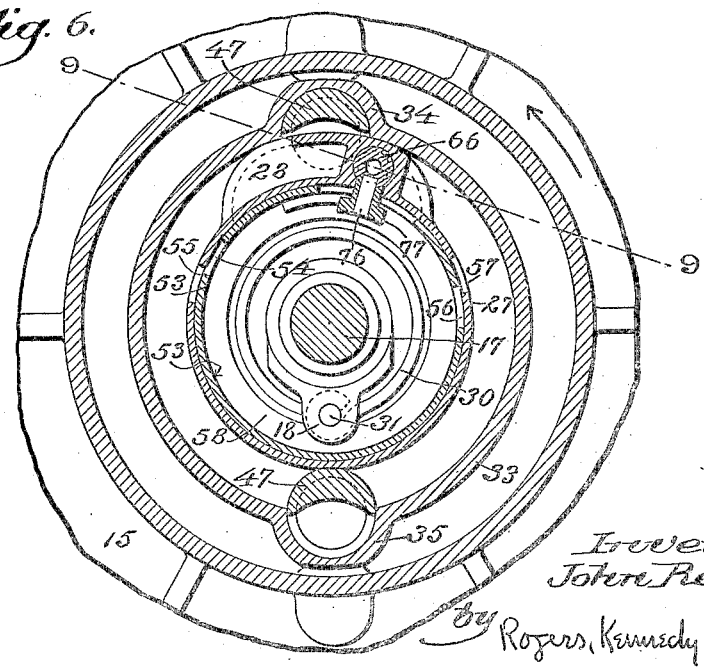

Fig. 6 is a similar right elevation partly in section on the line 6—6 of Fig. 3.

Fig. 7 is a similar elevation in section on the line 7—7 of Fig. 3 or Fig. 8.

Fig. 8 is a top plan view of the rotary piston portion of the liquid escapement mechanism shown in the previous figures.

Fig. 9 is a sectional view taken on the line 9—9 of Fig. 7.

Fig. 10 is a sectional view taken on the line 10—10 of Fig. 8.

Figure 2:
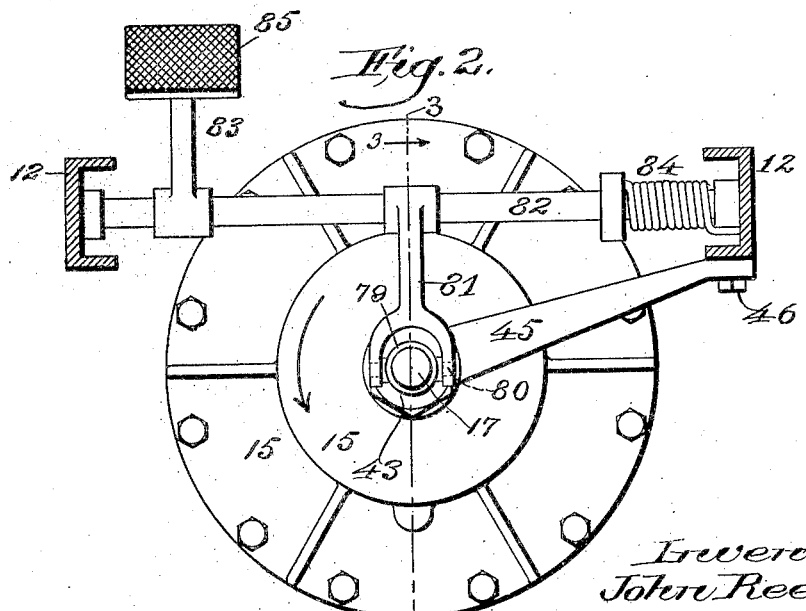
Fig. 2 is a right elevation of the parts shown in Fig. 1.

Referring first to Figs. 1 and 2, there are shown horizontal frame parts 12 of a motor vehicle. The engine shaft 13 is provided with a fly-wheel 14, which, however, is a hollow structure containing mechanism pertaining to this invention, the same being enclosed by means of a removable cover plate 15, which is extended rearwardly sufficiently to accommodate the interior mechanism.

The driving parts of the mechanism comprise the elements 13, 14 and 15, already mentioned, with which may be included a pair of studs or pins 16, interiorly mounted at opposite sides of the cover plate, as seen in Figs. 3 and 4.

The described elements 13 to 16 are constantly rotated by the engine when the latter is in operation, and at the same speed as the engine, which may be uniform under certain conditions, but variable at will or by automatic adjustment under certain changes of condition.

The driven member is shown in the form of a shaft 17, arranged in alignment with the engine shaft. Mounted rigidly to rotate with the shaft 17 is an arm 18, through which the rotative force is communicated to the shaft. At the forward end of the shaft 17 are bearing devices 19.

Having described the driving elements and the driven elements, I will next describe certain connections extending from the driving elements to what may be termed an intermediate rotating element, and later the connections from the latter to the driven shaft.

Upon one of the two studs 16 is a rotary gear 20, and upon the other is a similar gear 21. Each of these gears not only rotates about its center or stud 16, but also revolves with the driving parts about the axis of the apparatus, having thus a sort of a planetating motion. They will rotate in unison, and their speeds will be quite high, due to the usual high speed of automobile engines.

Each of the planetating gears 20 and 21 carries at its periphery a centrifugal weight 22, secured by bolt 23 upon the gear, and, as seen in Fig. 4, the two weights are correspondingly arranged, so that their actions will be in unison. In passing it may be explained that the centrifugal force of each weight 22 has a tendency to first forcibly advance, and then forcibly retard, the gear which it carries, as it passes around from one side to the opposite side.

A central gear 24 axially mounted and loosely surrounding the driven shaft engages both the gears 20 and 21. The gear 24 may be considered as one part of the intermediate element of the apparatus, and the energy of the driving parts is communicated to this gear through the peripherally weighted planetating gears 20 and 21, before mentioned. The transmitted motion is not uniform, but consists of accelerated motion, as the centrifugal weights move outward, and retarded motion as they are moved inwardly. Through a pin 25 the central gear 24 is connected to the flange of a hub 26, turning loosely on the driven shaft, and this hub and flange are extended rearward and enlarged, thereby constituting a cylindrical sleeve 27, the purpose and operation of which will be later described. As seen in Figs. 3 and 7, the hollow sleeve or cylinder 27 has at one side a protruding enlargement or extension, which, as will later appear, constitutes a sort of rotating piston taking part in certain hydraulic control action. The described elements 24 to 28 turn rigidly together, and may be considered as the intermediate element of the apparatus.

The connection to the driven shaft is by a strong coil spring 30, one end of which is secured to the pin 25, before mentioned, and the other end to a pin 31, mounted in the arm 18 of the driven shaft. This spring forms a resilient connection in the nature of a reservoir, since the rotation of the intermediate parts puts the spring under tension, thus storing energy, which is transmitted and drawn from the spring by the driven shaft, as the latter turns. The spring should be strong, yet of sufficient length so that several turns are possible, since in working at a heavy load the torque or rotary force to be transmitted to the driven shaft will be far greater than when the motor car is running light or on level ground.

I have now described in succession the driving parts, the driven parts, the connections from the driving parts to the intermediate element, the intermediate element, and the resilient connection from the latter to the driven element or shaft.

It is clear that, but for the centrifugal weights 22, no rotation would be delivered from the driving to the intermediate element, as the planetary gears would simply turn idly by their engagement with the central gear. The action of the centrifugal weights alters this condition, since the weights give alternate accelerations and retardations in the planetary gears, and therefore in the central gear. The action, however, is not positive or predetermined, but may be described as non-positive or yielding in nature. The intermediate element thus has this yielding connection from the driving parts, and also the resilient or storage spring connecting it with the driven parts. By the present invention the action of the yielding connections from the driving to the intermediate part is controlled, so as to give the desired transmitting results. This control is herein effected by means of the intermediate element, and more particularly the cylinder or sleeve 27 thereof, already described.

The rotary piston 28 travels around in the annular space between the cylindrical sleeve 27, which carries the piston, and a stationary cylinder 33, concentrically outside the sleeve. This annular space, and indeed all adjacent and connecting spaces within the apparatus, are supposed to be filled with a suitable fluid, preferably a liquid, such as oil, capable of active flow. Thus, the piston travel around within the cylinder forces the oil ahead of it to flow through the channels later to be described. In order that the flow may not simply be completely around the annular space between the sleeve and cylinder, the latter is provided at its topmost and lowermost points with semi-cylindrical extensions or barrels, 34 and 35 respectively, and in each of these is mounted a gate or pass 47, as will be described. The rear end of both of the casing extensions 34 and 35 is closed by an annular disk 36, secured thereto by bolts 37.

These described parts 35 to 37 are stationary in character, and may be so held by the following mountings. Extending rearwardly from the disk 36 is a cylindrical web 38, provided with upper and lower oil apertures 39, and connecting with a second disk or flange 40 formed on a sleeve 41, which loosely surrounds the driven shaft.

A bearing 42 is shown provided between the sleeve 41 and the cover 15 of the flywheel. The rear extremity of the sleeve 41 is provided with a confining nut 43. Between the bearing and the nut just mentioned is a ring 44, keyed to the sleeve 41, and having an arm 45 extending rigidly outward to where it is secured by a bolt 46 to a fixed frame part 12 of the machine. By this arrangement the entire series of described elements 33 to 45 is held stationary against rotation.

The revolving passes or gates 47 are seen in Fig. 7 in their opposite positions, the upper one adjusted to permit the piston 28 to pass in the direction of the arrow, and the lower one set reversely so as to occupy the annular channel and prevent oil flow circumferentially. Each of the revolving members 47 is mounted rotatively in the casing extension 35, and is automatically rotated in a slow manner so as to assume in turn the positions shown, in harmony with the movements of the piston. For the purpose of effecting these rotary movements, the left end of each revolving gate 47 is provided with a stud 48 near its periphery. These two studs 48, 48, therefore, are in the nature of cranks. Their relation is seen in left view in Fig. 3ª. They may both be driven by a combined connecting rod and eccentric strap 49, which extends rigidly from one stud 48 to the other, and in its center surrounds eccentric 50, mounted on a portion of the rotary sleeve 27, which is one part of the intermediate element of the mechanism. As the intermediate parts rotate, the crank 50 carries the member 49 circularly, and thereby shifts both of the revolving gates 47, so that each will permit the passing of the piston, and at other times occupy and close the annular space in which the piston advances.

The oil flow from the space in front of the advancing piston 28 is toward the interior through the rotary sleeve 27 and a ported sleeve 53, fitted within the sleeve 27. As seen in Figs. 6 and 7, the port sleeve has a port 54 in advance of the piston, and outside and co-operating with this is a port 55 in the sleeve 27. Depending on whether the ports are arranged to give a free passage for the oil, the oil will flow inwardly through the ports to the interior space 58, which is occupied by the reservoir spring 30, the driven shaft, etc. The oil, thus forced from the annular piston path inwardly through the ports just mentioned, is caused to flow outwardly from the interior space through port 56 at the opposite side of the port sleeve, and a cooperating port 57 in the piston sleeve 27. Each of the ports mentioned runs substantially the full length of its sleeve, so that, when the ports are wide open, the oil flow will be with negligible resistance. The control of the ports is effected by adjustable shifting of the port sleeve 53. As shown in Fig. 7, each port is but slightly open. Shifting one way or the other will further open or close the port.

The adjustable shifting movements of the port sleeve are effected through an outwardly projecting bar 59, which is capable of moving within one portion of the piston 28, and itself acts somewhat as a piston, and therefore may, for convenience, be termed a port piston. When this is pressed forwardly, that is in the direction of rotation of the piston sleeve 27, it will open the ports, and when moving relatively rearward, it will close them.

The piston 28 is built with a cylindrical outer wall, as best seen in Figs. 8 and 10, and front and rear side walls. The front side wall 60 is in fact hollow, to form a sort of box or flat casing, and the port actuating piston or bar 59 travels within this part of the main piston. The space 61 within the box portion 60 of the piston is occupied by a cross pin 62, see Figs. 7 and 9, serving as a stop for the movement of the port piston 59. Beneath the stop pin 62 is seen an opening or passage 63, formed in the port sleeve 53 and leading into the interior space 58. The oil, thus being permitted to flow into and from the main piston, permits the to and fro adjusting movements of the interior or port controlling piston. A spring 65 may be used, tending always to pull the port piston 59 backwardly, that is, from the stop pin 62, and this action may be facilitated or ensured at all times by a slight leakage in the interior piston or between it and the main piston.

Also within the main piston, and serving incidentally as a stop for the backward movements of the interior piston, is a cylindrical member 66, which is rotatively mounted and constructed to serve as a circular valve, and also as a passage by which oil may pass from in front of the main piston into the space 61 thereof to cause the shifting adjustment of the port piston. Figs. 8 to 10, in conjunction with Fig. 7, show the construction and action thereof. The circular valve 66 is fitted within the transverse body portion of the main piston. This body portion is provided with a longitudinal opening 68 at its front side for the admission of oil under pressure, and a similar opening 69 at its rear side. The cylindrical valve 66 has a large port 70 at one side, and a small or narrow one 71 at the opposite side. These ports communicate with an interior longitudinal passage 72, extending to the forward end of the circular valve, where the latter is provided with a series of small exit openings 73, so that the oil flowing through the circular valve may pass into the interior 61 of the box-like portion 60 of the main piston.

Various adjustments of the circular valve will give various results. As shown in Figs. 9 and 10, oil is permitted to flow into the valve and thence into the casing 60, so as to press forwardly on the port piston 59 and adjust it to open the main ports. If the cylindrical valve be turned slightly to the left from the position shown in Fig. 10, this will open a through passage from port 68 to port 69, thus short-circuiting the oil flow and preventing any adjustment of the main ports. If the adjustment be continued still further to the left, both ports 68 and 69 will be closed.

It will be obvious that fine adjustment of the valve 66 will enable the ports therein to be opened more or less, and thus determine the rate of flow of oil through the interior of the main piston, and thereby the position of the port sleeve and the rate of flow of oil through the system.

In order to turn the cylindrical valve 66, it is indicated in Figs. 8 and 9 as having a peripheral cam groove 75, engaged by a pin 76. The pin 76, as shown in Fig. 3, is carried by a slide 77, which may be moved longitudinally to shift the pin, and thereby rotate the valve. The slide 77 is formed rigidly with a ring 78 loosely surrounding the groove in a flanged sleeve 79, which is non-rotative. The sleeve is mounted loosely directly around the driven shaft 17 and extends rearwardly to an exterior point, where it is provided with opposite pins 80, through which the sleeve may be shifted axially to shift the slide 77, and thereby turn the valve. The pins 80 are engaged by a forked lever 81, fulcrumed at 82, and having a pedal extension 83, which may be depressed against the resistance of a spring 84 to adjust the valve 66 at will to its different positions.

In Figs. 3 and 5 are seen, attached at the top and bottom of the stationary elements 38 and 40, a pair of projecting plates or scoops 86, for the purpose of diverting any oil which may be whirling circumferentially within the cover plate 15 and causing such oil to flow readily inward through the apertures 39 and thence into the interior space 58, thus ensuring that the interior system is maintained full of oil.

In operation the hydraulic parts of the apparatus, including the liquid or oil itself and the rotary piston 28 with which it cooperates, constitute in effect a hydraulic pawl and ratchet. They operate in certain adjustments, including that indicated in the figures, to freely permit rotation in one direction and to lock the intermediate parts against rotation in the opposite direction. Thus, as the valve 66 is shown adjusted, rotation of the intermediate parts is permitted in a forward or counterclockwise direction. The forward thrust of the piston, due to the action of the planetating gears, is freely permitted. As such thrust is applied, it causes the liquid which is in front of the piston to enter through the port 68 into the interior of the valve 66, and from the valve through the aperture 73 into the space 61 within the piston box 60. This oil flow or pressure forces the port controlling piston 59 forwardly, and, as will be understood from Fig. 7, this shifts the port sleeve 53 so as to open widely the ports 55, 54, 56 and 57. Oil thereby being able freely to circulate from the annular space in front of the piston through the interior on to the annular space behind the piston, the piston may advance practically without resistance. Any attempt, however, to thrust the piston rearwardly will cause a reverse hydraulic action within the valve, which in conjunction with the spring 65, will cause an immediate closing of the main ports, so that the intermediate parts are locked against reverse movement. When the valve 66 is adjusted in the opposite manner, the main ports act oppositely, opening only for a clockwise thrust of the intermediate parts and closing with an opposite thrust, so that only a reverse or clockwise rotation is possible. As already explained, a third piston adjustment renders the oil capable of flowing freely in either direction, thus releasing the intermediate and driven parts. A fourth adjustment prevents liquid flow in either direction, thus locking the intermediate and driven parts and serving as a brake.

The moving elements carried by the driving member or flywheel, including the weights 22, constitute a yielding or pulsating connection between the driving and driven members of such nature and arrangement that, as the driving member rotates, the connections operate to produce torque alternately in opposite directions. When acting in one direction the driven parts are advanced, but owing to the liquid pawl and ratchet, the opposite torque is not transmitted to the driven parts, but is thrown back upon the driving member and thus conserved. The action of the centrifugal connections may be described as comprising two phases, during one of which the weights are being displaced inward or toward the center of the system against centrifugal force, and during the other of which the weights, having passed their innermost position, travel outwardly under the influence of centrifugal force. In the first phase the energy of the driving parts operating through the planetating gears, the rotation of which is strongly resisted by the centrifugal force of the weights, operates to produce a torque which advances the driven member. The retarded planetating gears, being carried around with the flywheel, carry around with them the central gear and the other intermediate parts, thus delivering energy into the reservoir spring. During the second phase the driven member, as stated, is held against reverse rotation, so that when the centrifugal weights have passed the apex of their movement and started outwardly at the opposite side, the centrifugal force thereof, unable to operate upon the central gear, acts to apply the resulting torque to advance the driving member. The power not utilized is thus conserved, and eventually is transmitted to the driven parts at an increased torque. The centrifugal weights carried by the driving parts, thus acting as a resiliently yielding and reasserting device, might be replaced by analogous resilient devices having similar action and result within the present invention. Thus, powerful springs might be substituted for the weights, and in fact I have shown such an embodiment of the underlying principles of the present invention in a companion application, which may be referred to for a more full and complete description of principles and operation. In the present embodiment, as in said copending application, the first phase of action, or that in which the resilient device receives power from the driving member and imparts power to the driven member, may be indefinitely prolonged, thus giving unit speed ratio. This condition comes about automatically when the torque required in the driven shaft is not greater than, but equals that delivered by the driving shaft. From this advantageous action it results that during normal road driving the mechanism is free from internal motion, and all the parts rotate as a unit. It is only when the driven parts require a greater torque that the play of the internal mechanism takes place, and this results, as described, in a sort of temporary conserving of the driving energy, which is fractionally thrown into the driven member on alternate phases of action, and is thrown back through the resilient device into the flywheel or driving member in the other phases, with the net result that the driven parts, rotating at a reduced speed ratio, possess the desired superior torque to meet the upgrade or other practical conditions. The change of action of the mechanism in these respects is automatic, and hence the operator is enabled to proceed solely by the throttle, and the transmission from the engine to the vehicle wheels controls itself in such way that, as the load or resistance increases, the driven speed decreases, accompanied by an increase of driven torque. The reservoir spring is an important supplement to the mechanisms described, but it might be located at various points between the vehicle wheels and the intermediate part upon which the described resilient connections directly act. The so-called intermediate elements, rigidly connected and turning together, in reality constitute a driven part, which, however, is driven irregularly or intermittently, and the reservoir spring renders even and smooth the transmission of such drive to the final driven parts. The driving action on the vehicle wheels will be fairly uniform in view of the extent of yield in the reservoir spring and the frequency with which energy impulses are delivered into it. Indeed, when driving at unit ratio, the second phase of action is eliminated, and power is continually delivered to the intermediate member and reservoir. At reduced ratios, the action will be intermittent, but each power imparting action may continue over two or three or more complete revolutions, whereas the intervening periods will be exceedingly brief, a half revolution or less, during which the resilient element will be restoring to the driving parts the increased power or torque. The difference between the power received by the resilient element from the driving member and the power restored to the latter will be the power consumed by the driven shaft.

The novel transmitting means of this application is a combination including a specific one-way device, namely a hydraulic device as distinguished from a mechanical pawl and ratchet, and I do not herein make any underlying claims to the transmitting means, but only claims specific to a one-way device of a hydraulic nature; the underlying combination being claimed in my copending application Serial Numbers 364,897 filed March 11, 1920 and 531,591 filed January 25, 1922.

It will thus be seen that I have described a variable speed transmission embodying the principles of the present invention; and since many matters of combination, arrangement, design and detail may be variously modified without departing from the novel principles, it is not intended to limit the invention to such matters except in so far as set forth in the appended claims.

What is claimed is:

1. A variable speed transmission apparatus comprising in combination, a rotating driving member, a yielding and reasserting device carried on said driving member, a rotatable driven member, and a train of connections, between said device and the driven member, including a one-way device controlling the same, whereby rotation is transmitted through said device, in one direction only, to the driven member; said one-way device consisting of a hydraulic mechanism substantially as described wherein the liquid flows in one direction during forward rotation but is checked against reverse flow.

2. Transmission apparatus comprising in combination with the rotary driving and driven members, an intermediate member, an elastic connection from the intermediate to the driven member, a yielding and reasserting device between the driving and intermediate members whereby power is imparted alternately in opposite directions, and a hydraulic control means substantially as described wherein the liquid flows in one direction as power is transmitted in one direction but is checked with reverse of direction, to prevent reverse transmission.

3. Transmission as in claim 2, and wherein the hydraulic means is controllable in flow at will to determine the driving effect on said intermediate member.

4. Transmission as in claim 2, and wherein the hydraulic means contains valves adjustable at will to determine the action of said intermediate member.

5. Transmission as in claim 2, and wherein the hydraulic means contains valves adjustable at will to determine the action of said intermediate member such that in one adjustment the intermediate member may advance but not reverse, and in another adjustment it may rotate reversely but not advance.

6. Transmission as in claim 2, and wherein the hydraulic means contains valves adjustable at will to determine the action of said intermediate member such that in one adjustment the intermediate member may advance but not reverse, and in another adjustment it may not rotate in either direction.

7. Transmission as in claim 2, and wherein the hydraulic means contains valves adjustable at will to determine the action of said intermediate member such that in one adjustment the intermediate member may advance but not reverse, and in another adjustment it may rotate in either direction.

8. Apparatus as in claim 1 and wherein the hydraulic mechanism consists of a rotated sleeve (27) having a projecting piston (28) travelling between the sleeve and an outer fixed casing (33), the casing having opposite gates 47, rotated to permit the piston to pass them alternately while keeping closed the annular passage between the sleeve and casing.

9. A variable speed transmission apparatus comprising in combination, a rotating driving member, a yielding and reasserting device carried on said driving member, a rotatable driven member, and a train of connections, between said device and the driven member, including a one-way device controlling the same, whereby rotation is transmitted through said device, in one direction only, to the driven member, said one-way device comprising a plural ported rotary sleeve carrying a piston, a casing exterior to the sleeve forming an annular space in which the piston travels, gates preventing annular circulation of liquid in said space, whereby the liquid forced by the piston will pass through a sleeve port to the interior and therefrom through a second port to a point behind the piston, and means for adjusting said ports.

10. Apparatus as in claim 9 and wherein the port adjusting means consists of a ported shell within said sleeve and means for relatively adjusting it.

11. Apparatus as in claim 10 and wherein the shell adjusting means consists of an auxiliary piston, extending within said first piston, and a liquid valve, exteriorly controlled, for hydraulically governing the position of the auxiliary piston.

In testimony whereof, I have affixed my signature hereto.

JOHN REECE.